TAPE READER-BRAKE ASSEMBLY

Filed March 26, 1962 4 Sheets-Sheet 1

INVENTORS
NORMAN MALKIN &
ALVIN C. OLSON
BY
Douglas M. Clarkson
ATTORNEY

INVENTORS
NORMAN MALKIN &
ALVIN C. OLSON
BY
Douglas M. Clarkson
ATTORNEY

INVENTORS
NORMAN MALKIN &
ALVIN C. OLSON
BY
Douglas M. Clarkson
ATTORNEY

TAPE READER-BRAKE ASSEMBLY

Filed March 26, 1962 4 Sheets-Sheet 4

INVENTOR.
NORMAN MALKIN &
ALVIN C. OLSON
BY
Douglas M. Clarkson
ATTORNEY

United States Patent Office
3,119,020
Patented Jan. 21, 1964

3,119,020
TAPE READER-BRAKE ASSEMBLY

Alvin C. Olson, Huntington Station, and Norman Malkin, Flushing, N.Y., assignors to Potter Instrument Company, Inc., Plainview, N.Y., a corporation of New York Filed Mar. 26, 1962, Ser. No. 182,555
9 Claims. (Cl. 250—219)

This invention, generally, relates to tape reader apparatus and, more particularly, to a tape reader apparatus having a new and improved tape braking assembly.

In a tape reader apparatus which is adapted to read perforated tape, it is the usual practice to drive the tape with a fast-acting pinch roller actuated by a solenoid and to stop the tape with a drag or solenoid actuated brake which is engaged when the pinch roller is released. By this means, it is possible to stop on the character which is used to encode the stop command even when the tape is moving at reading rates as high as 1000 characters per second or more.

However, one disadvantage of existing tape reader apparatus is that spring-back of the tape when the pinch roller is released occasionally causes the stop character to move backward over the read head far enough so that it is read again when the next start command is received. The unit then stops again and fails to advance properly. In these tape reader apparatus, the pinch roller and drive capstan normally are located on the down-stream side of the head and the brake is normally located up-stream.

The characteristics surrounding this undesirable feature of spring-back is described in greater detail in an application of George E. Comstock, 3d, Serial No. 182,577, entitled "Tape Reader Apparatus" filed concurrently herewith, and assigned to the assignee of the present invention.

It is an object of the invention to provide an improved structural arrangement uniquely adapted to brake a fast-moving tape while avoiding the development of any tendency of springback.

It is also an object of the invention to provide a new and improved perforated tape reader apparatus.

A further object of the invention is to provide a new and improved braking arrangement for a perforated tape reader apparatus.

A still further object of the present invention is to provide a unitary structural arrangement for a perforated tape reader apparatus.

Another object of the invention is to provide a perforated tape reader apparatus adapted to admit of ready adjustment and highly accurate operation.

A tape reader apparatus in accordance with the present invention, generally, includes a transducer means adapted for sense a predetermined information-representing code, such as a series of apertures, formed on a recording medium which usually takes the form of an elongated web. A suitable source of radiation is positioned in a predetermined relationship with a radiation detector means to sense the information-representing code on the web.

Compatible with current practice in tape reader apparatus which requires starting and stopping the tape repeatedly at rapid rates, a brake assembly is included in the tape reader apparatus and is positioned in a particular manner so as not to interfere with the reading portion of the apparatus while, at the same time, is adapted to react with the tape in controlling the motion thereof.

These and other objects and advantages of the invention will become more apparent from the following detailed description of a preferred embodiment thereof described with respect to the accompanying drawings in which similar reference characters represent corresponding parts in the several views, in which.

Figures 1, 2:
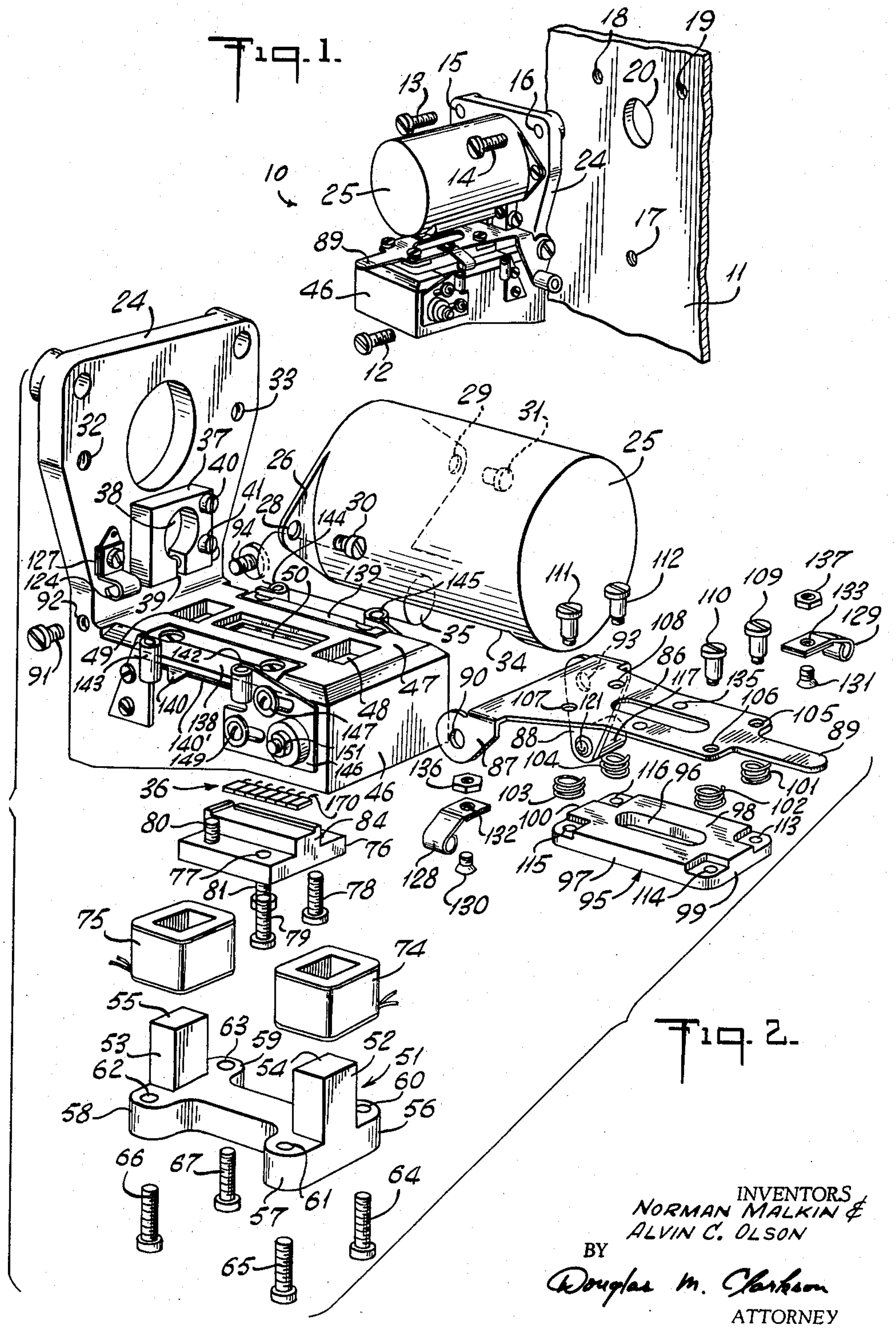
FIG. 1 is a perspective view of an assembled tape reader apparatus showing the unitary structural arrangement thereof.
FIG. 2 is an exploded view in perspective of the unit shown in FIG. 1.

Referring now to the form of the invention shown in FIG. 1, the complete, assembled, unitary tape reader-brake apparatus is indicated generally by the numeral 10, and the numeral 11 identifies a suitable panel to which the unit 10 is attached for support. It will be noted that three bolts 12, 13 and 14 are provided to pass through three clearance holes, only the holes 15 and 16 being visible in FIG. 1, for threading into threaded apertures 17, 18 and 19, respectively, in the support panel 11.

Figures 7, 8:
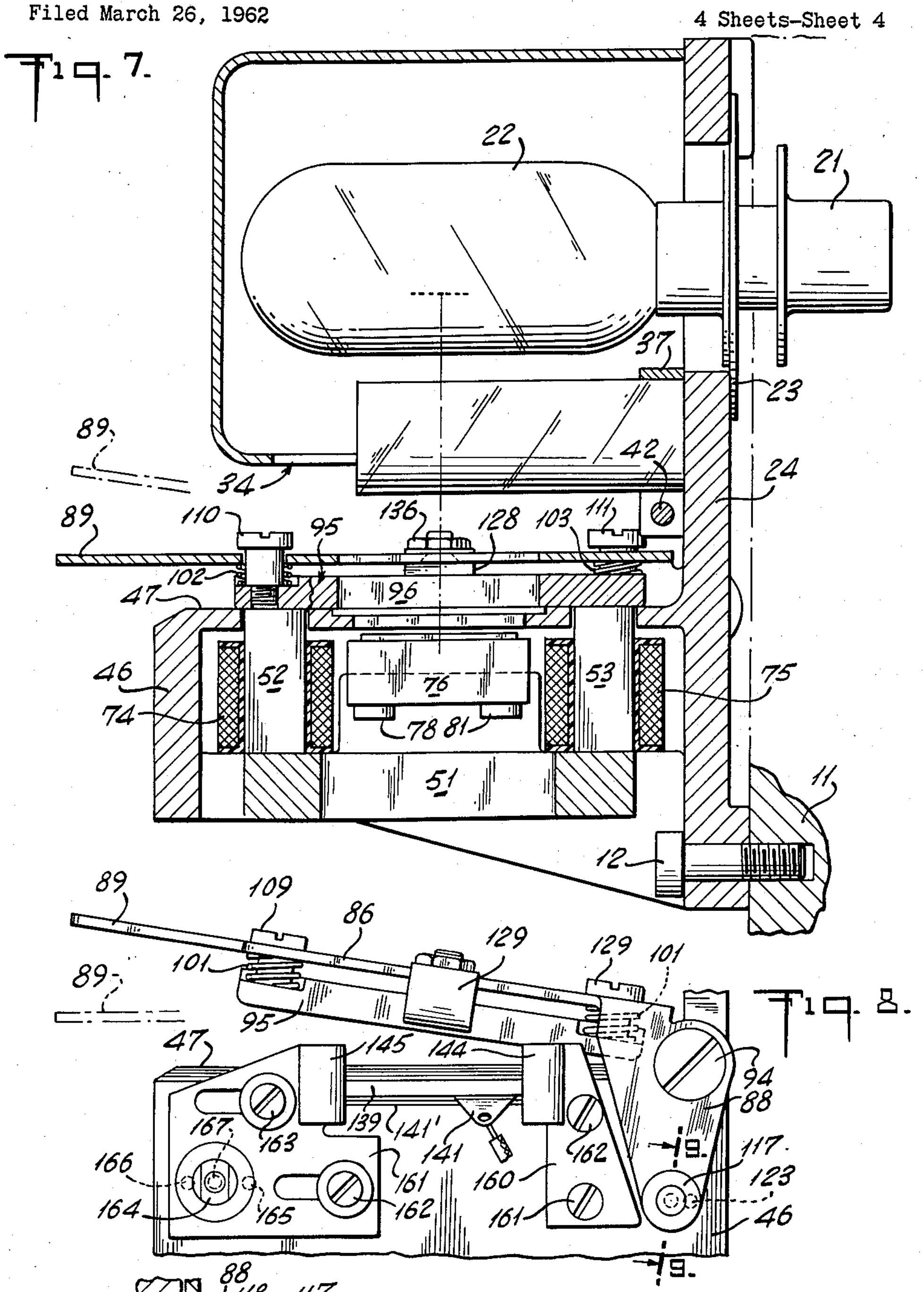
FIG. 7 is a right side view in cross section of the unit shown in FIG. 1 as taken in the plane of the line 7—7 in FIG. 3.
FIG. 8 is a right side view of that portion of the unit shown in FIG. 4.
Figure 9:
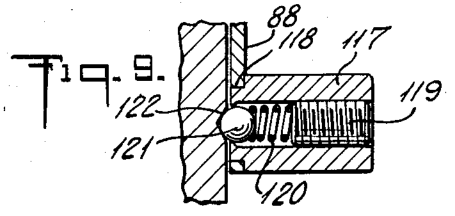
FIG. 9 is a view in cross section taken along the line 9—9 in FIG. 8.

A large opening 20 is formed in the panel 11 to permit clearance for a socket 21, FIG. 7 attached to receive and provide electrical connection for a source of radiation such as a light bulb 22. A flange 23 provides means to attach the socket 21 to a vertical frame 24 of the unit 10.

An enclosure 25 is formed with oppositely extending edges 26 and 27 each having clearance holes 28 and 29 therein to permit bolts 30 and 31, respectively, to pass therethrough for threading through threaded openings 32 and 33 in the frame 24. The enclosure 25 is provided with an opening 34 to permit radiation from the light bulb 22 to pass therethrough, as will be understood readily.

Referring now more particularly to FIG. 2 of the drawings, a lens 35 is positioned in or opposite the opening 34 in the enclosure 25 to focus radiation from the light bulb 22 on a series of photoelectric cells, indicated generally by the numeral 36. The lens 35, in the form shown, is a rod of clear glass or plastic and is supported from the frame 24 by means of a block 37 having a centrally located opening 38 and a slot 39 in one side thereof. The block 37 is supported directly on the frame 24 by two threaded bolts 40 and 41.

Figures 3, 4, 5:
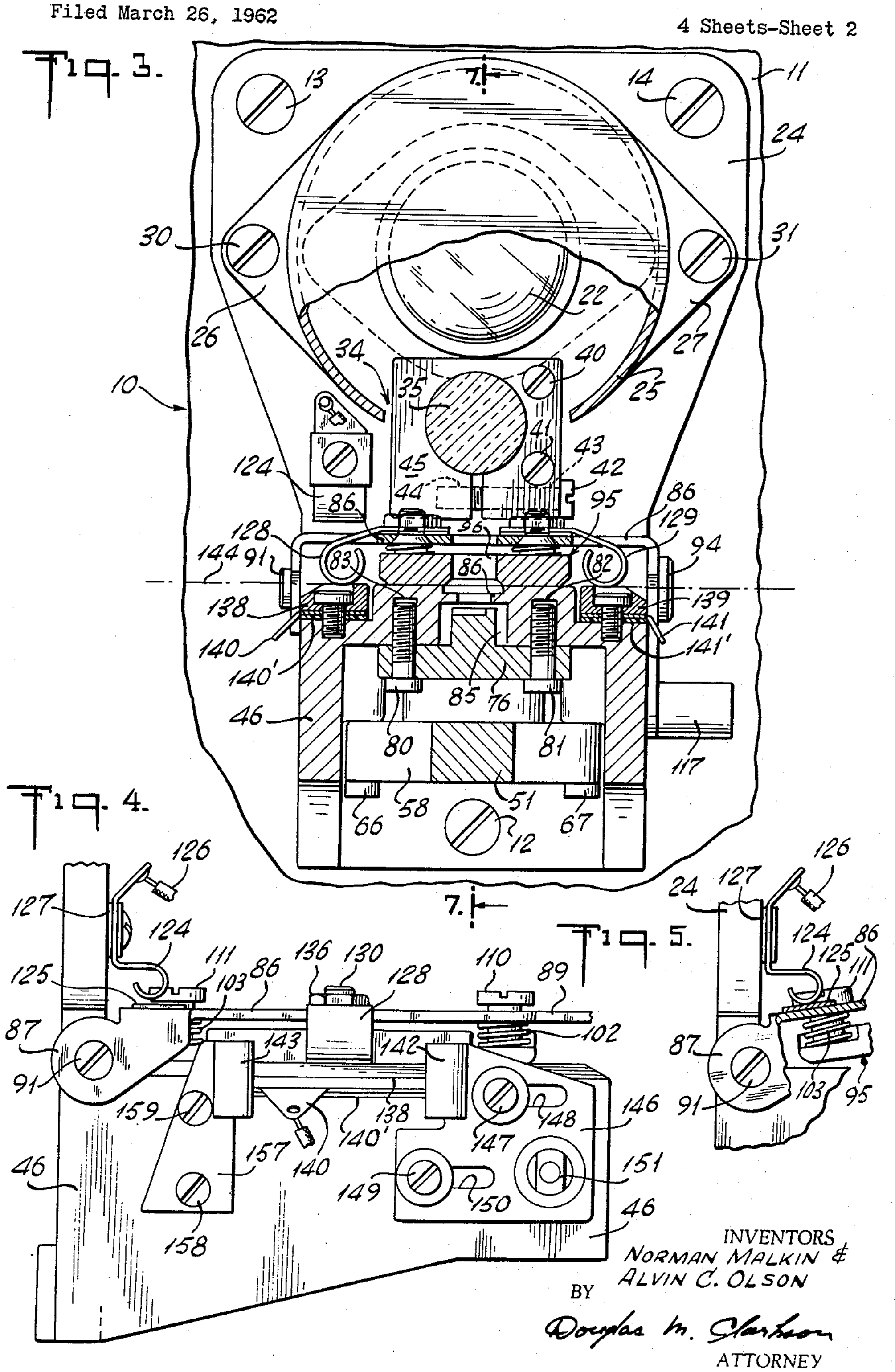
FIG. 3 is a front view partly in section of the unit shown in FIG. 1.
FIG. 4 is a left side view of the lower half of the unit shown in FIG. 1.
FIG. 5 is a fragmentary view showing the hinge portion seen in FIG. 4 with the unit in a tape loading position.

As better seen in FIG. 3 of the drawings, a bolt 42 passes through a clearance hole identified by the numeral 43 and is threaded into a threaded hole 44 so that by tightening the bolt 42, the side 45 of the block 37 is pulled to grip the lens 35 therein.

The lower portion of the frame 24 is formed into a housing 46 having an upper surface 47 in which is located two substantially square openings 48 and 49 spaced apart from each other so that an elongated opening 50 may be positioned therebetween. The two openings 48 and 49 permit the poles of an electromagnet to emerge flush with the surface 47, and the opening 50 permits light focused by the lens 35 to impinge upon the photoelectric cells 36.

The core of an electromagnet is identified by the numeral 51, the core having two poles 52 and 53 extending upwardly so that the ends 54 and 55, respectively, pass into the matching openings 48 and 49 and will be flush with the surface 47 when the core 51 is assembled therewith. The core 51 is provided with four projections 56, 57, 58 and 59, through each of which is located a clearance hole 60, 61, 62 and 63 to receive bolts 64, 65, 66 and 67, respectively.

Figure 10:
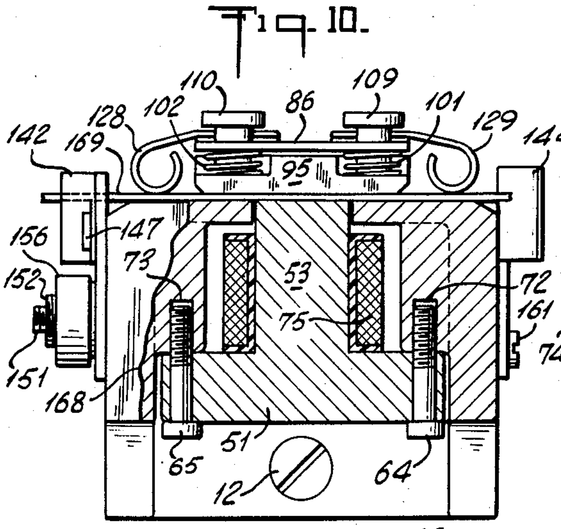
FIG. 10 is a front view partly in section of that portion of the unit shown in FIG. 4.
Figure 11:
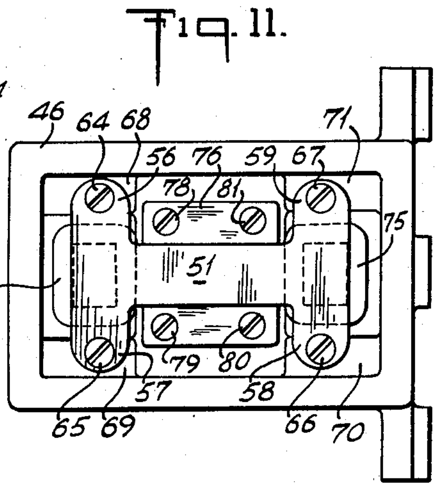
FIG. 11 is a bottom view of the unit as shown in FIG. 4.
Figure 12:
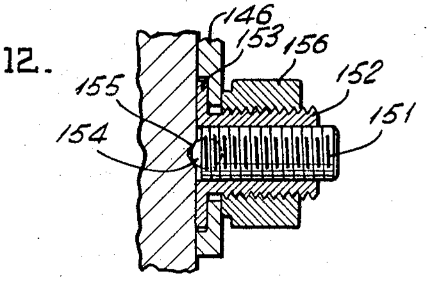
FIG. 12 is a view in cross section taken along the line 12—12 in FIG. 6.

As best seen in FIGS. 10 and 11, the core 51 is positioned so that the projections 56, 57, 58 and 59 rest against surfaces 68, 69, 70 and 71, respectively, and the bolts 64, 65, 66 and 67 are threaded into suitable openings in each of the surfaces, such threaded openings being illustrated by the openings 72 and 73 in FIG. 10.

Before assembly, electric windings 74 and 75 are disposed about the poles 52 and 53, respectively, the windings 74 and 75 being formed separately and mounted on the respective poles or formed directly on the poles, as desired.

Nested in between the two poles 52 and 53 is a support block 76 on which is mounted the photoelectric cells 36. The support block 76 has four clearance holes, all similar to the one hole 77 visible in FIG. 2, and four bolts 78, 79, 80 and 81 are provided to mount the support block 76 rigidly within the enclosure 46 as shown in FIGS. 3 and 11.

As best seen in FIG. 3, the threaded holes 82 and 83 are illustrative of the four holes into which the bolts 78, 79, 80 and 81 are threaded to fix the support block 76 within the housing 46. A centrally located, upwardly extending raised portion 84 is formed on the support block 76 on which the photoelectric cells 36 are supported in an opening 85.

The opening 85 is formed with an inwardly extending flange 86 to support a transparent glass or plastic dust cover over the opening 85 to protect the photoelectric cell 36, FIG. 2, as a tape is passing across the surface 46. The glass cover, which is supported by the flange 86, is not shown in the drawings, but will be readily understood.

Fitted over the surface 47 of the housing 46 is a pivotable support bracket 86 having flanges 87 and 88 extending at substantially right angles at the rear edge thereof and having a handle 89 extending forwardly for convenient grasping in the hand of a user. The flange 87 is provided with a clearance hole 90 to permit a bolt 91 to pass therethrough readily for threading into a threaded opening 92.

Similarly, the flange 88 is provided with a clearance hole 93 to permit a bolt 94 to pass readily therethrough for threading into an opening, not visible in FIG. 2, but similar to the opening 92. By means of the clearance holes 90 and 93 and the bolts 91 and 94, the support bracket 86 is pivotable by raising or lowering the handle 89.

A principal function of the support bracket 86 is to support a single, unitary brake member 95 having a centrally disposed, elongated opening 96 therein to permit light rays to pass through for focusing on the photoelectric cells 36. While the brake member 95 is formed of a single unitary element, the sides 97 and 98 provide the working elements of the brake member for engaging a tape, with the openings 50 and 96 substantially in alignment. The two sides 97 and 98 of the brake member 95 are connected together to form the unitary structure between the end portions 99 and 100.

To contribute to the compactness of the structural arrangement, the brake member 95 has four recessed surfaces at each of its corners to receive coil springs 101, 102, 103 and 104 which provide a slightly greater downward pressure than would be provided by the mere weight of the brake member 95 alone.

The support bracket 86 has formed therein four clearance holes 105, 106, 107 and 108 to permit four bolts 109, 110, 111 and 112 to pass therethrough and through the springs 101, 102, 103 and 104, for threading into threaded apertures 113, 114, 115 and 116.

As illustrated in FIGS. 7 and 8 of the drawings, when the handle 89 is in its lower or operating position, the coil springs 101, 102, 103 and 104 provide a slight downward pressure against the brake member 95. With the handle 89 in its raised position, as shown in FIG. 8, the brake member 95 is supported from the bracket 86 by the four bolts 109, 110, 111 and 112, the coil springs 101, 102, 103 and 104 being loosely disposed about the four bolts.

The right flange 88 extending from the support bracket 86 is elongated downwardly and has a hub 117 press fitted in an opening 118. A setscrew 119 is threaded into an opening in the hub 117 to adjust the tension in a spring 120 reacting against a small ball 121 which engages a detent 122 in the side of the housing 46. The detent 122 receives the ball 121 for supporting the bracket 86 in its raised or tape-loading position, and a second detent 123 receives the ball 121 when the handle 89 is lowered to maintain the bracket 86 in its working or operating position.

As seen in FIGS. 4 and 5, with the handle 89 in its raised position, a spring contact 124 engages a terminal 125 for completing an electrical circuit through the housing 46 and an electrical connection 126 to provide a signal to a computer that the tape reader apparatus is in its tape-loading position. The spring contact 124 is supported on the frame 24, but is insulated therefrom by a suitable insulating washer 127. While the spring contact 124 may touch directly against the support bracket 86, the terminal element 125 is provided to form a contact and to prevent wear against the support bracket 86.

A tape "end" sensor is provided by two spring contacts 128 and 129 attached to the support bracket 86 by means of two bolts 130 and 131 which pass through clearance holes 132 and 133, respectively, in the spring contacts 128 and 129. With the spring contacts 128 and 129 supported on the upper surface of the bracket 86, the two bolts 130 and 131 pass upwardly first through clearance holes 134 and 135 before passing through the clearance holes 132 and 133. A nut 136 is threaded onto the upper end of the bolt 130, and a nut 137 is threaded onto the upper end of the bolt 131. These members are shown assembled in FIG. 3 of the drawings.

The contact surfaces against which the spring contacts 128 and 129 react are provided by bar members 138 and 139 having an electrical terminal member 140 and 141, respectively, extending therefrom. Each of the bar members 138 and 139 along with its respective elertrical contact member 140 and 141 is insulated from the housing 46 by an appropriate, electrically non-conductive material 140′ and 141′, as best seen in FIG. 3 of the drawings.

A broken line 144 indicates the path of travel of a tape through the apparatus 10, and the presence of the tape will keep the spring contacts 128 and 129 separated from the bar members 138 and 139. But when an end of a tape passes either one of the spring contacts 128 or 129, the spring will contact its respective bar member providing completition of an electrical circuit to indicate that an end of a tape has passed due, for example, to a break in the tape.

Figure 6:
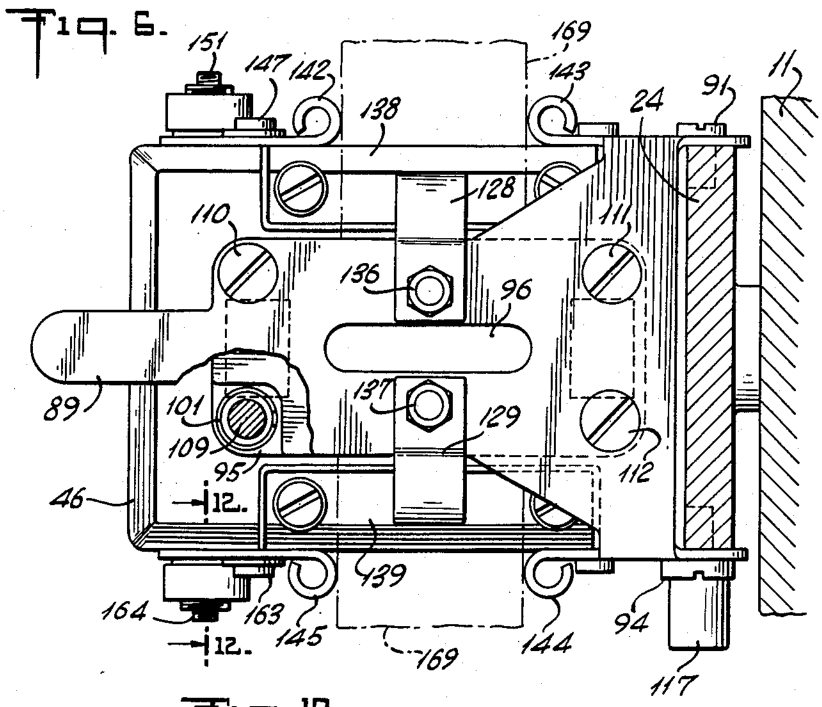
FIG. 6 is a plan view of that portion of the unit shown in FIG. 4.

As a tape passes across the opening 50 in the upper surface 47 of the housing 46, it is puided by four guide elements 142, 143, 144 and 145 as best seen, for example, in FIG. 6 of the drawings. While each of these guide elements may take any desired configuration or form, such as roller elements adapted to turn about a vertical axis, they are shown in the present form of the invention as being curved or arcuate ends of respective guide plates.

The guide plate from which the guide element 142 is formed is best seen in FIG. 4 and is designated by the numeral 146. The particular guide plate 146 is adjustable in position to provide for different widths of tape.

A bolt 147 passes through an elongated slot 148 and is threaded into the side of the housing 46. Similarly, a bolt 149 passes through a slot 150 and into a threaded aperture in the left side of the housing 46.

A third bolt 151 is in the form of a setscrew in that it is threaded into a sleeve 152 having an annular flange 153 fitted under the guide plate 146. The purpose of the bolt 151 is to apply a pre-selected loading to a ball 154 fitted into a detent 155. The ball 154 may be spring loaded if desired.

With the guide plate 146 positioned appropriately, a nut 156 is tightened to maintain that position. Several detents similar to the detent 155 may be located at various intervals across the side of the housing 46, and with the bolts 147 and 149 not tightened but merely snug fitted, the guide plate 146 may be moved in step fashion by sliding to any desired position.

The guide element 143 is an integral part of a fixed guide plate 159 attached to the left side of the housing 46 by screws 158 and 159. The fixed guide element 144 on the opposite side of the housing 46 from the fixed guide element 143, is best seen in FIG. 8 of the drawings and is an integral part of a guide plate 160 which is attached to the right side of the housing 46 by means of screws 161 and 162.

The guide element 145 is movable similar to the guide element 142, forming an integral part of a movable guide plate 161. Screws 162 and 163 are similar to those referred to previously and identified by the numerals 147 and 149, and the bolt 164 is similar in construction to the bolt 151. FIG. 8 shows by the dotted circles 165 and 166 other detents in which a ball 167 may be positioned, as described previously.

In FIG. 10 of the drawings, the housing 46 is cut away to the right of a line 168 to reveal the inner structure of the magnet core 51, and to the left of the line 168, the bolt 151 and the nut 156 are visible, as well as a portion of the sleeve 152. In FIG. 10, as well as in FIG. 6, a tape is identified by the numeral 169.

The numeral 170 is used to identify generally suitable electrical leads connected with the photoelectric cells 36. While the cells 36 may be of any desired type, one type that has been found to be satisfactory is manufactured by Hoffman Electronics Corporation under the designation "HPC 9–01."

The following claims are intended to define the valid scope of this invention over the prior art and to cover all changes and modifications falling within the true spirit and valid scope of the invention.

What is claimed is:

1. In an apparatus for processing information on a recording medium, the combination comprising,
   a transducer means including a radiation source and means to sense a predetermined information-representing code formed on the recording medium;
   the transducer means being adapted further to permit the recording medium to pass in information sensing relationship therewith; and
   a brake means including a friction member positioned contiguously with one side of the transducer means for reacting with the recording medium at least on one side of the path of said radiation and having an opening to permit radiation from the radiation source to reach the recording medium and including electrical means to acuate the brake means for reacting with the recording medium.

2. In a tape reader apparatus as set forth in claim 1 including a second friction member similar to the first-mentioned friction member and positioned immediately adjacent the opposite side of the transducer means from the first-mentioned friction member.

3. In a tape reader apparatus as set forth in claim 2 wherein the first and second friction members are joined as a single unitary element.

4. In a tape reader apparatus as set forth in claim 2 including electromagnetic means to operate both mentioned friction members substantially simultaneously.

5. In a tape reader apparatus as set forth in claim 3 including a pivotable member to support the single unitary element to permit the element to be moved for loading a tape in the apparatus.

6. In a tape reader apparatus as set forth in claim 5 wherein the pivotable member has a surface spanning the space between the radiation source and the detection means and including means to permit radiation to pass through to the detection means.

7. In a tape reader apparatus as set forth in claim 6 wherein the included means to permit radiation to pass has an elongated aperture.

8. In a tape reader apparatus as set forth in claim 5 wherein the pivotable member includes resilient support means to bias the single unitary element in the braking direction with a predetermined force when the brake means is not operated.

9. In a tape reader apparatus, the combination comprising,
   a light source including an enclosure for a bulb and having an opening and to permit light to pass in a predetermined direction,
   a housing including means to support a plurality of individual photoelectric elements therein and including an opening in the direction of the light source,
   lens means including a substantially circular rod of transparent material supported to focus the light from the light source on the individual photoelectric elements,
   a pivotable member including a handle and having an opening therein to permit light focused by the lens means to pass therethrough for focusing on the individual photoelectric elements,
   a single unitary brake element having an opening therethrough at least as large as the opening in the pivotable member,
   a plurality of coil springs between the unitary brake element and the pivotable member,
   a plurality of bolts attaching the pivotable member and the unitary brake element together and each bolt passing through one coil spring so that the brake element and pivotable member are supported with their respective apertures in substantial alignment,
   at least two detent position-determining means including a setscrew and coil spring to urge a ball into a detent for retaining the pivotable member in a predetermined position,
   adjustable tape guides on each side of the housing to guide tapes of various widths past the photoelectric elements, and
   electromagnet means including poles extending on opposite sides of the photoelectric elements and electric windings to provide a control over the braking action developed by the brake element.

References Cited in the file of this patent

UNITED STATES PATENTS

| | | |
|---|---|---|
| 1,819,439 | Peterson | Aug. 18, 1931 |
| 2,129,837 | Knodel | Sept. 13, 1938 |
| 2,586,076 | Nichols | Feb. 19, 1952 |
| 2,864,609 | Trimble | Dec. 16, 1958 |
| 2,909,912 | Lowe et al. | Oct. 27, 1959 |
| 3,062,464 | Moose et al. | Nov. 6, 1962 |